(12) United States Patent
Englebardt et al.

(10) Patent No.: US 9,984,361 B2
(45) Date of Patent: May 29, 2018

(54) SELECTIVELY PROVIDING CASH-BASED E-COMMERCE TRANSACTIONS

(71) Applicant: MasterCard International Incorporated, Purchase, NY (US)

(72) Inventors: Leland S. Englebardt, New York, NY (US); Bruce Owens, Kirkwood, MO (US); Wade N. Plummer, Chicago, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days. days.

(21) Appl. No.: 13/767,052

(22) Filed: Feb. 14, 2013

(65) Prior Publication Data

US 2013/0226697 A1    Aug. 29, 2013

Related U.S. Application Data

(63) Continuation-in-part of application No. 13/403,769, filed on Feb. 23, 2012.

(51) Int. Cl.
*G06Q 40/00* (2012.01)
*G06Q 20/22* (2012.01)
*G06Q 20/12* (2012.01)

(52) U.S. Cl.
CPC .......... *G06Q 20/227* (2013.01); *G06Q 20/12* (2013.01)

(58) Field of Classification Search
USPC ....... 705/39, 14, 40, 26.8, 14.66, 30, 79, 35, 705/21, 44; 726/8; 235/379, 380;

(Continued)

(56) References Cited

U.S. PATENT DOCUMENTS 6,029,150 A * 2/2000 Kravitz ................. G06Q 20/02
705/39
6,711,264 B1 * 3/2004 Matsumoto ........... H04L 9/0891
380/277

(Continued)

FOREIGN PATENT DOCUMENTS

JP        2004-118667       4/2004
KR    10-2003-0011501       2/2003

OTHER PUBLICATIONS

Paynearme website and product descriptions [online]. Retrieved on May 24, 2012 from the Internet: http://www.paynearme.com/about.

(Continued)

*Primary Examiner* — Tien C Nguyen
(74) *Attorney, Agent, or Firm* — Leason Ellis LLP

(57) ABSTRACT

Systems and methods are provided for facilitating alternative payment submissions. According to a one aspect, a selection by a purchaser of one or more items is received, one or more characteristics associated with the purchaser are processed to determine a reliability of the purchaser, and an option to provide payment for the one or more items by way of a first payment method in lieu of a second payment method is selectively provided to the purchaser based on the determined reliability, the second payment method corresponding to a payment method requiring the purchaser to provide banking information and the first payment method corresponding to a payment method not requiring the purchaser to provide banking information. Other embodiments of the various aspects include corresponding systems, apparatus, and computer program products.

18 Claims, 12 Drawing Sheets

(58) Field of Classification Search
USPC ............ 273/139; 379/77; 370/401; 194/217; 463/42; 455/406; 709/218; 700/216; 713/171, 186
See application file for complete search history.

(56) References Cited

U.S. PATENT DOCUMENTS

| | | | | |
|---|---|---|---|---|
| 7,325,136 | B2* | 1/2008 | Alldredge | G06Q 20/02 380/283 |
| 8,145,567 | B2* | 3/2012 | Banaugh | G06Q 20/10 705/39 |
| 8,621,641 | B2* | 12/2013 | Carow | H04L 63/08 726/26 |
| 2001/0002468 | A1 | 5/2001 | Nel | |
| 2002/0035538 | A1* | 3/2002 | Moreau | G06Q 20/02 705/39 |
| 2002/0095374 | A1 | 7/2002 | Ellis | |
| 2002/0095376 | A1 | 7/2002 | Likourezos et al. | |
| 2003/0208440 | A1* | 11/2003 | Harada | G06Q 20/02 705/39 |
| 2005/0021462 | A1* | 1/2005 | Teague | G06Q 20/04 705/40 |
| 2006/0074799 | A1* | 4/2006 | Averyt | G06Q 20/042 705/40 |
| 2006/0095327 | A1* | 5/2006 | Vaughn et al. | 705/14 |
| 2007/0005466 | A1* | 1/2007 | Rosenblatt et al. | 705/35 |
| 2007/0061590 | A1* | 3/2007 | Boye | G06F 21/305 713/186 |
| 2007/0181676 | A1 | 8/2007 | Mateen et al. | |
| 2008/0015985 | A1* | 1/2008 | Abhari | G06Q 20/10 705/42 |
| 2008/0148376 | A1* | 6/2008 | Onozawa et al. | 726/8 |
| 2009/0216651 | A1* | 8/2009 | Ghafoor et al. | 705/17 |
| 2009/0327042 | A1 | 12/2009 | Flake et al. | |
| 2010/0017413 | A1* | 1/2010 | James | 707/10 |
| 2010/0299248 | A1 | 11/2010 | Burke | |
| 2012/0197797 | A1 | 8/2012 | Grigg et al. | |
| 2013/0006785 | A1* | 1/2013 | Perkins | G06Q 20/027 705/18 |

OTHER PUBLICATIONS

Ukash website and product descriptions [online]. Retrieved on May 24, 2012 from the Internet: http://www.ukash.com/global/en/what-is-ukash.aspx.

Flipkart website and product descriptions [online]. Retrieved on May 24, 2012 from the Internet: http://www.flipkart.com/s/help/payments.

Livepay website and product descriptions [online]. Retrieved on May 24, 2012 from the Internet: http://livepay.com.br/nossa_missao.html.

* cited by examiner

TRANSACTION NOTIFICATION

From: Vendor.com
To: Payment Processor

For: Vendor.com order no. <u>10001</u>

Total Payment Amount: <u>$541.24</u>

FIG. 4

From: Payment Processor
To: Purchaser
RE: Your unique code for cash payment for Vendor.com order no. 10001

Thank you for your recent purchase! Please follow these instructions to pay cash for your item at a local ATM:

1. Go to a local participating ATM and input the following unique code that corresponds to your purchase:
   15873689544476 ← 184

2. Deposit $550 cash into the ATM, as instructed (original purchase price of $541.24 rounded up to the nearest $10 increment)

3. Your item will be shipped as soon as payment confirmation is received

*\* Please note that you must make payment within 48 hours of your purchase, or your order will be canceled and your unique code will not work!*

FIG. 5

PAYMENT NOTIFICATION

From: Payment Processor
To: Vendor.com

For: Vendor.com order no. <u>10001</u>

Payment Amount Received: <u>$550</u>

<u>Please deliver/ship item!</u>

FIG. 7

| | # of times 'pay with cash' option selected | # of times payment received | Reliability % | Average time from purchase to payment |
|---|---|---|---|---|
| User A | 25 | 20 | 80% | 22.6 hours |
| User B | 12 | 11 | 92% | 33.2 hours |

| Timeframe | Discount/Penalty |
|---|---|
| Provide payment within 6 hours of order | 5% off total purchase price |
| Provide payment between 6-12 hours of order | 2.5% off total purchase price |
| Provide payment between 12-24 hours of order | No discount/penalty |
| Provide payment between 24-36 hours of order | $5.00 penalty |
| Provide payment between 36-48 hours of order | $10.00 penalty |
| After 48 hours | Order canceled – User reliability rating downgraded |

FIG. 12

SELECTIVELY PROVIDING CASH-BASED E-COMMERCE TRANSACTIONS

CROSS-REFERENCE TO RELATED APPLICATIONS

This application is a continuation-in-part application of U.S. patent application Ser. No. 13/403,769, filed Feb. 23, 2012 which is incorporated by reference in its entirety.

TECHNICAL FIELD OF THE INVENTION

This specification relates generally to the field of payment processing and, in particular, to facilitating alternative payment submissions.

BACKGROUND OF THE INVENTION

With the continued proliferation of the Internet and Internet-connected devices (e.g., smartphones, computers, etc.), e-commerce has become an increasingly important retail channel. Users can search, browse, research, and compare various products and vendors in a manner that is far more efficient and cost-effective than by visiting a traditional retail store. Similarly, maintaining an e-commerce website can be more profitable for some retailers when compared to the significant costs associated with maintaining a traditional 'real-world' retail presence.

Traditionally, e-commerce transactions are executed through the use of credit card numbers (or, in certain cases, bank account information). In doing so, upon selecting an item for purchase, a user provides his/her credit card number (as well as various further identifying/security information, such as billing address, security code, etc.), and the payment is processed by the vendor using conventional credit card processing techniques. However, it can be appreciated that users who are unwilling or unable to provide such credit card (or bank account) information are effectively precluded from availing themselves of the benefits of e-commerce.

It is with respect to these and other considerations that the disclosure made herein is presented.

SUMMARY OF THE INVENTION

Technologies are presented herein in support of systems and methods for facilitating alternative payments. The method includes the actions of receiving a selection by a purchaser of one or more items, processing, with one or more processors, one or more characteristics associated with the purchaser to determine a reliability of the purchaser, and selectively providing to the purchaser, based on the determined reliability, an option to provide payment for the one or more items by way of a first payment method in lieu of a second payment method, the second payment method including a payment method requiring the purchaser to provide banking information and the first payment method including a payment method not requiring the purchaser to provide banking information.

These and other aspects, features, and advantages can be appreciated from the accompanying description of certain embodiments of the invention and the accompanying drawing figures and claims.

BRIEF DESCRIPTION OF THE DRAWINGS

FIG. 4 depicts a screenshot of an exemplary transaction notification in accordance with at least one embodiment disclosed herein;

FIG. 5 depicts an exemplary e-mail notification notifying the relevant party of the unique identifier, in accordance with at least one embodiment disclosed herein;

FIG. 7 depicts an exemplary payment notification in accordance with at least one embodiment disclosed herein;

FIG. 9 depicts an exemplary chart showing aspects of previous instances in which users elected to utilize an alternative payment submission;

FIG. 12 depicts an exemplary table of adjustments to various transaction parameters.

DETAILED DESCRIPTION OF CERTAIN EMBODIMENTS OF THE INVENTION

Figure 1:
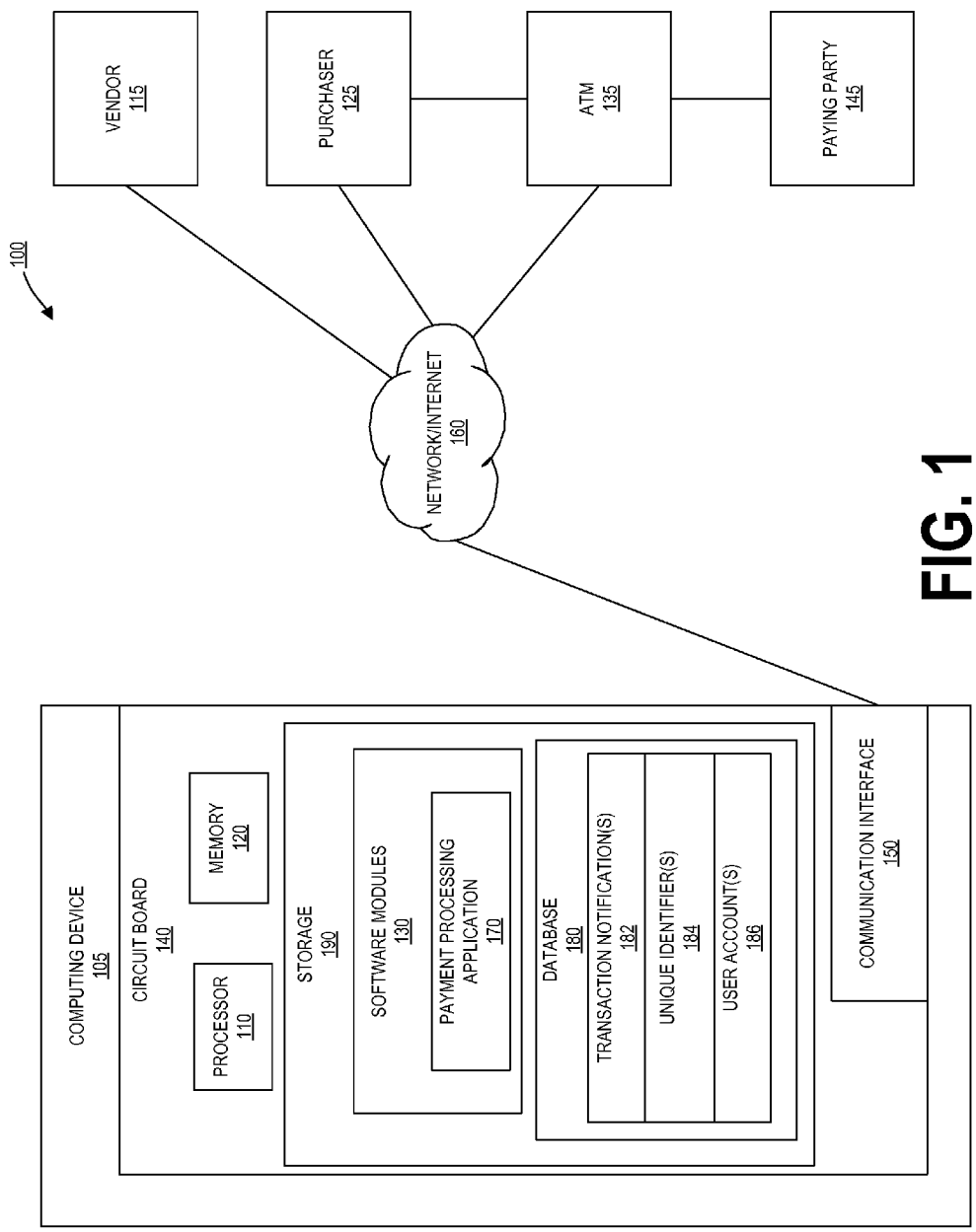
FIG. 1 is a high-level diagram illustrating an exemplary configuration of a payment processing system.

By way of overview and introduction, various systems and methods are described herein that facilitate and enable alternative payment submissions. It can be appreciated that despite the many advantages and conveniences that e-commerce transactions provide to both vendors and purchasers, only purchasers who are in possession of certain payment tools such as credit cards and/or bank accounts ('banked individuals') are able to avail themselves of e-commerce transactions. However, potential purchasers who are not in possession of such payment tools ('unbanked individuals') are effectively precluded from engaging in e-commerce.

Moreover, despite developments in data and network security, incidents of data vulnerability, identity theft, hacking, etc., continue to be reported. As such, many banked individuals are hesitant to provide credit card or banking information over the Internet. It can be appreciated that these potential purchasers are also effectively precluded from engaging in traditional e-commerce transactions. As a result, e-commerce vendors fail to capitalize on a number of potential transactions due to such logistical/formal challenges (on the part of unbanked individuals) and consumer caution (on the part of banked, but cautious, individuals).

In an effort to enable such unbanked and cautious individuals to engage in e-commerce, the systems and methods described herein enable a series of operations whereby a purchaser can initiate an e-commerce transaction, such as through a vendor website, in a traditional manner. However, after selecting items for purchase, instead of paying for such items using a credit card or bank account, the user can select to provide an alternative payment submission, such as cash.

Based on this selection, a notification can be generated (containing elements such as the vendor reference number and the final purchase price) and transmitted to a central machine where a unique identifier (such as a number, code, or barcode) can be generated. This unique identifier can then be transmitted, as a representation of the transaction, to the purchaser, and/or to another individual who is responsible for making the payment.

The unique identifier is then input into a conventional ATM (automated teller machine). Upon receiving the unique identifier, the ATM can elicit a cash payment for the transaction. Upon receipt of the cash payment, the vendor is notified of the payment. In doing so, both the purchaser and the vendor are able to reap the benefits of e-commerce transactions, even though the purchaser does not have or is unwilling to provide credit card or banking information.

Moreover, in light of the fact that selecting an option to provide an alternative payment submission does not require such payment to be submitted immediately upon initiating the purchase, it can be expected that some number or percentage of such alternative payment transactions will not ultimately be completed. As such, it can be advantageous to determine the likelihood that a selection by a purchaser of an option to provide an alternative payment submission is ultimately likely to result in a completed transaction. In doing so, previous instances of the purchaser providing such an alternative payment submission can be processed to determine a frequency with which the purchaser provides payment subsequent to a selection of the first payment method. Utilization of such an alternative payment submission can be restricted by a vendor to those purchasers who demonstrate a reliability that meets or exceeds a reliability threshold.

Additionally, being that various purchasers may demonstrate greater or lesser diligence in providing payment subsequent to a selection of an alternative payment submission, it can be advantageous for vendors to restrict the option to utilize such an alternative payment submission to only those users determined to be relatively expedient in providing payment. In doing so, previous instances of the purchaser providing an alternative payment submission can be processed to determine an expediency with which the purchaser actually provides/submits such payment. The option to provide an alternative payment submission can be limited to those purchasers demonstrating a payment expediency that meets or exceeds a defined threshold.

In order to incentivize purchasers to reliably provide payment in completion of such alternative payment transactions, it can also be advantageous for vendors to implement various adjustments to the pricing of the transaction (e.g., a discount or promotion to purchasers who maintains a certain reliability percentage). Additionally, discounts can be offered to purchasers who provide payment expediently (e.g., within a defined timeframe of initiating the purchase), while additional charges or penalties can be levied with respect to transactions where the purchaser is not expedient in providing payment. In doing so, a vendor can incentivize purchasers to utilize the alternative payment submission option in a responsible fashion.

Moreover, in certain scenarios promotional offers can be generated based on the contents of an order being paid for/picked up (i.e., the items purchased by selecting an alternative payment submission option) in conjunction with various characteristics that can be determined with respect to the experience the purchaser is likely to have (e.g., the layout of the store). In doing so, both the online/e-commerce activity of the purchaser and the real-world experience that the purchaser is likely to encounter can be accounted for in generating such a promotion.

The following detailed description is directed to systems and methods for facilitating alternative payments. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

An exemplary computer system is shown as a block diagram in FIG. 1 which is a high-level diagram illustrating an exemplary configuration of a payment processing system 100. In one arrangement, computing device 105 can be a personal computer or server. In other implementations, computing device 105 can be a tablet computer, a laptop computer, or a mobile device/smartphone, though it should be understood that computing device 105 of payment processing system 100 can be practically any computing device and/or data processing apparatus capable of embodying the systems and/or methods described herein.

Computing device 105 of payment processing system 100 includes a circuit board 140, such as a motherboard, which is operatively connected to various hardware and software components that serve to enable operation of the payment processing system 100. The circuit board 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

In certain implementations, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Internet 160 using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within payment processing system 100. For instance, program code stored in a computer readable storage device in a server can be downloaded over a network from the server to payment processing system 100.

In certain implementations, included among the software modules 130 is a payment processing application 170 that is executed by processor 110. During execution of the software modules 130, and specifically the payment processing application 170, the processor 110 configures the circuit board 140 to perform various operations relating to payment processing with computing device 105, as will be described in greater detail below. It should be understood that while software modules 130 and/or payment processing application 170 can be embodied in any number of computer executable formats, in certain implementations software modules 130 and/or payment processing application 170 comprise one or more applications that are configured to be executed at computing device 105 in conjunction with one or more applications or 'apps' executing at remote devices, such as computing device(s) 115, 125, 135, and/or 145 and/or one or more viewers such as internet browsers and/or proprietary applications. Furthermore, in certain implementations, software modules 130 and/or payment processing application 170 can be configured to execute at the request or selection of a user of one of computing devices 115, 125, 135, and/or 145 (or any other such user having the ability to execute a program in relation to computing device 105, such as a network administrator), while in other implementations computing device 105 can be configured to automatically execute software modules 130 and/or payment processing application 170, without requiring an affirmative request to execute. It should also be noted that while FIG. 1 depicts memory 120 oriented on circuit board 140, in an alternate arrangement, memory 120 can be operatively connected to the circuit board 140. In addition, it should be noted that other information and/or data relevant to the operation of the present systems and methods (such as database 180) can also be stored on storage 190, as will be discussed in greater detail below.

Also preferably stored on storage 190 is database 180. As will be described in greater detail below, database 180 contains and/or maintains various data items and elements that are utilized throughout the various operations of payment processing system 100, including but not limited to, transaction notifications 182, unique identifiers 184, and user accounts 186, as will be described in greater detail herein. It should be noted that although database 180 is depicted as being configured locally to computing device 105, in certain implementations database 180 and/or various of the data elements stored therein can be located remotely (such as on a remote device or server—not shown) and connected to computing device 105 through network 160, in a manner known to those of ordinary skill in the art.

As referenced above, it should be noted that in certain implementations, such as the one depicted in FIG. 1, various of the computing devices 115, 125, 135 and/or 145 can be in periodic or ongoing communication with computing device 105 thorough a computer network such as the Internet 160. Though not shown, it should be understood that in certain other implementations, computing devices 115, 125, 135, and/or 145 can be in periodic or ongoing direct communication with computing device 105, such as through communications interface 150.

Communication interface 150 is also operatively connected to circuit board 140. Communication interface 150 can be any interface that enables communication between the computing device 105 and external devices, machines and/or elements. In certain implementations, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g., using the 802.11 standard) though it should be understood that communication interface 150 can be practically any interface that enables communication to/from the circuit board 140.

At various points during the operation of payment processing system 100, computing device 105 can communicate with one or more computing devices, such as those controlled and/or maintained by one or more individuals and/or entities, such as vendor 115, purchaser 125, ATM 135, and/or paying party 145, each of which will be described in greater detail herein. Such computing devices transmit and/or receive data to/from computing device 105, thereby preferably initiating maintaining, and/or enhancing the operation of the payment processing system 100, as will be described in greater detail below. It should be understood that the computing devices 115 can be in direct communication with computing device 105, indirect communication with computing device 105, and/or can be communicatively coordinated with computing device 105, as will be described in greater detail below. While such computing devices can be practically any device capable of communication with computing device 105, in the preferred embodiment certain computing devices (e.g., that of vendor 115) are preferably servers, while other computing devices (e.g., that of purchaser 125) are preferably user devices (e.g., personal computers, handheld/portable computers, smartphones, etc.), though it should be understood that practically any computing device that is capable of transmitting and/or receiving data to/from computing device 105 could be similarly substituted.

It should be noted that while FIG. 1 depicts payment processing system 100 with respect to computing devices 115, 125, 135, and 145, it should be understood that any number of computing devices can interact with the payment processing system 100 in the manner described herein. It should be further understood that a substantial number of the operations described herein are initiated by and/or performed in relation to such computing devices. For example, as referenced above, such computing devices can execute applications and/or viewers which request and/or receive data from computing device 105, substantially in the manner described in detail herein.

In the description that follows, certain embodiments and/or arrangements are described with reference to acts and symbolic representations of operations that are performed by one or more devices, such as the payment processing system 100 of FIG. 1. As such, it will be understood that such acts and operations, which are at times referred to as being computer-executed or computer-implemented, include the manipulation by processor 110 of electrical signals representing data in a structured form. This manipulation transforms the data and/or maintains them at locations in the memory system of the computer (such as memory 120 and/or storage 190), which reconfigures and/or otherwise alters the operation of the system in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the payment processing system 100.

Other components shown in FIG. 1 can be varied from the illustrative examples shown. The different embodiments can be implemented using any hardware device or system capable of running program code. In another illustrative example, payment processing system 100 can take the form of a hardware unit that has circuits that are manufactured or configured for a particular use. This type of hardware can perform operations without needing program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to, computing device 105, computing devices 115, 125, 135, and 145 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

The operation of the payment processing system 100 and the various elements and components described above will be further appreciated with reference to the method for facilitating an alternative payment submission as described below, in conjunction with FIGS. 2-12.

Figure 2:
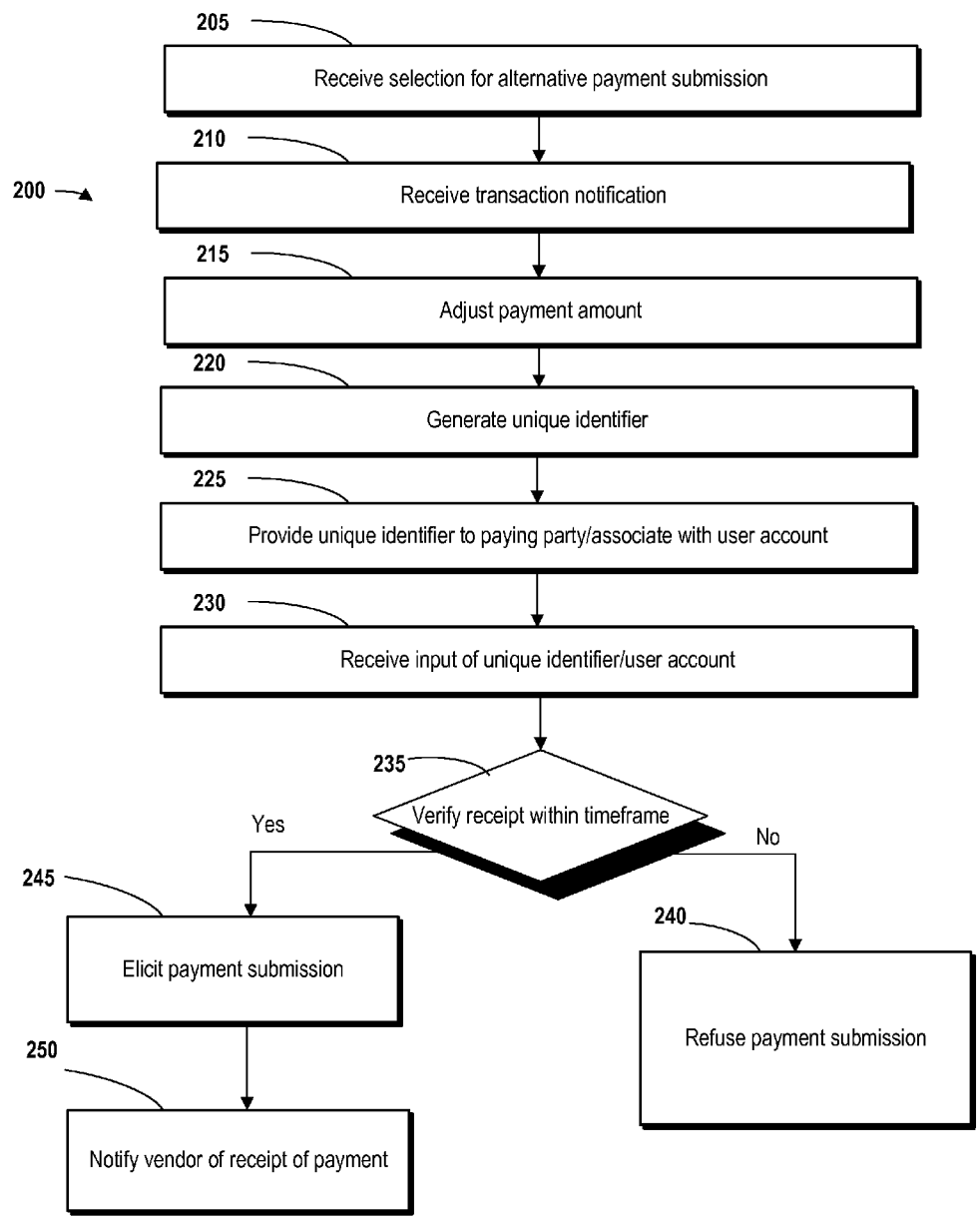
FIG. 2 is a flow diagram showing a routine that illustrates a broad aspect of a method for facilitating an alternative payment submission in accordance with at least one embodiment disclosed herein.

Turning now to FIG. 2, a flow diagram is described showing a routine 200 that illustrates a broad aspect of a method for facilitating an alternative payment submission in accordance with at least one embodiment disclosed herein. It should be appreciated that several of the logical operations described and/or referenced herein are implemented (1) as a sequence of computer implemented acts or program modules running on payment processing system 100 and/or (2) as interconnected machine logic circuits or circuit modules within the payment processing system 100. The implementation is a matter of choice dependent on the requirements of the device (e.g., size, energy, consumption, performance, etc.). Accordingly, the logical operations described and/or referenced herein are referred to variously as operations, steps, structural devices, acts, or modules. As referenced above, various of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 3:
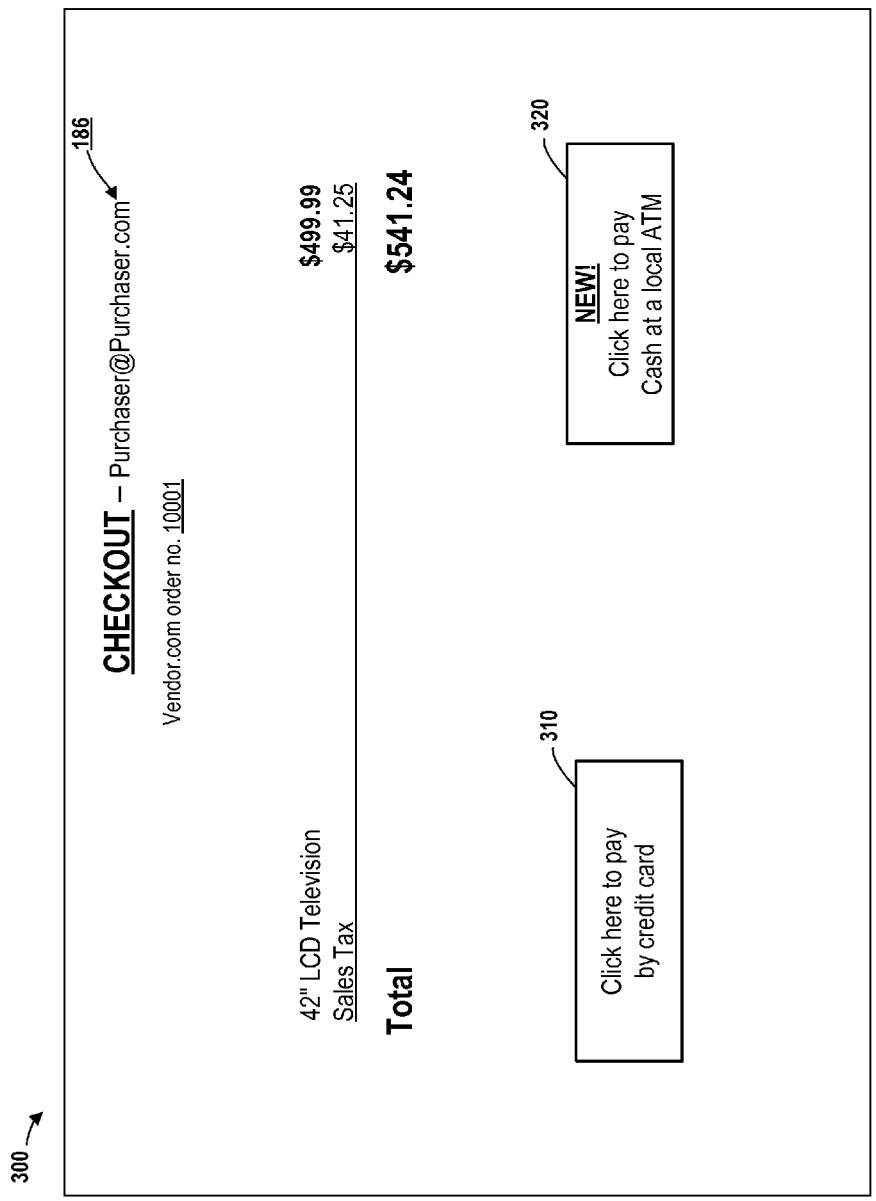
FIG. 3 depicts an exemplary screenshot of a checkout screen at an e-commerce website maintained by vendor in accordance with at least one embodiment disclosed herein.

The process begins at step 205 where processor 110 executing one or more of software modules 130, including, in certain implementations, payment processing application 170, configures computing device 105 to receive a selection by a purchaser 125 indicating that the purchaser 125 intends to provide an alternative payment submission. For example, FIG. 3 shows an exemplary screenshot 300 of a checkout screen at an e-commerce website maintained by vendor 115 that is presented to a purchaser 125 during the course of an e-commerce transaction. It can be appreciated that upon selecting one or more items for purchase, purchaser 125 can be presented with the option to pay using a conventional payment method such as a credit card (i.e., by selecting button 310), or alternatively, to pay for such items using an alternative payment submission (i.e., by selecting button 320), in lieu of providing credit card or banking information. By selecting button 320, purchaser 125 indicates his/her intention to utilize an alternative payment submission, such as cash, in lieu of traditional payment methods such as credit card or bank transfer.

Then, at step 210, processor 110 executing one or more of software modules 130, including, in certain implementations, payment processing application 170, configures computing device 105 to receive a transaction notification, such as from vendor 115. For example, FIG. 4 depicts an exemplary transaction notification 182. Such transaction notification 182 preferably includes a payment amount (that is, the amount agreed upon by the purchaser 125 in purchasing the item(s) from the vendor 115), and corresponds to the transaction itself (e.g., corresponds to an order number or reference provided by vendor 115, enabling vendor 115 to identify the order for which payment will be submitted). By way of illustration and with reference to FIG. 4, upon receiving a selection (such as at step 205) that a purchaser 125 intends to provide an alternative payment submission in order to complete a transaction between the purchaser 125 and the vendor 115, vendor 115 can generate a transaction notification 182, such as an electronic notification or message, that reflects the payment amount that the purchaser 125 has agreed to pay, as well as some form of identification (e.g., an order number issued by the vendor) that references the particular order. It should be noted that details of the transaction itself (e.g., the items actually purchased by purchaser 125 from vendor 115, such as '42" LCD Television' as shown in FIG. 3) need not be reflected in the transaction notification. Moreover, the identity of the purchaser 125 also need not be provided. In doing so, the privacy of the purchaser 125 can be maintained, as can the nature of the transaction between the vendor 115 and the purchaser 125 (such as the nature of the item being purchased). Thus, in certain implementations, the only information included in the transaction notification 182 is the payment amount (that is the amount to be paid to the vendor 115 in order to complete the transaction) and some manner of identifying the transaction itself (e.g., a vendor order number, enabling the vendor to identify that an order has been paid for and can thus be released or shipped, as will be described below).

Then, at step 215, processor 110 executing one or more of software modules 130, including, in certain implementations, payment processing application 170, optionally configures computing device 105 to adjust the payment amount. In certain implementations, the payment amount can be adjusted to a whole number amount that is conducive to cash (i.e., paper money) payment. That is, it can be appreciated that the final purchase amount that the purchaser 125 is required to provide to the seller can be a non-whole number amount, especially when accounting for taxes and various shipping and other additional charges and fees. However, being that many ATMs cannot accept coins or provide change in the form of coins (in the event that a user provides a payment amount greater than the final purchase amount), it is necessary that purchasers 125 provide an exact payment amount. In light of the fact that non-whole number payment amounts can be inconvenient for purchasers 125 wishing to pay cash (e.g., requiring them to count loose change), the payment amount can be adjusted (either above or below the original final payment amount determined by the vendor) in order to require the purchaser 125 to provide a whole number amount that is more conducive to cash payment. By way of illustration, the payment amount can be rounded to the nearest dollar, five dollar, 10 dollar, or 20 dollar amount. For example, it can be appreciated with reference to FIG. 5 that the total purchase price ($541.24, as shown in FIG. 3) can be rounded up to the nearest $10 increment ($550) in order to facilitate the processing of cash for such a transaction. It should be understood that the purchaser is preferably notified of the referenced adjustment, such as through a message or notification, and authorization of such adjustment is preferably elicited from the purchaser in order to complete the transaction.

Moreover, in certain implementations the payment amount can be adjusted or converted to account for differences in currency between the vendor and the purchaser. That is, in scenarios where a vendor is selling an item in one currency (e.g., in U.S. Dollars) while a purchaser is only capable of paying in another currency (e.g., in Euros), the payment amount can be adjusted/converted (e.g., from Dollars to Euros, and can further account for currency exchange fees, as necessary). In doing so, even purchasers that are otherwise only capable of providing payment in one currency (e.g., tourists in a foreign country, or users wishing to purchase an item from an e-commerce vendor located in another country) can still complete e-commerce transactions with vendors who are otherwise only capable of receiving payment in another currency.

At step 220, processor 110 executing one or more of software modules 130, including, in certain implementations, payment processing application 170, configures computing device 105 to generate a unique identifier 184. In certain implementations, the unique identifier 184 can be a number, alphanumeric code, barcode, QR code, or any other such unique identifier 184 that can be generated in order to identify and/or reference a particular transaction notification and/or transaction. For example, FIG. 5 depicts an exemplary unique identifier 184 that is a unique combination of 13 numeric digits. In certain implementations, such a unique identifier 184 can be generated such that the identifier reflects one or more aspects of the transaction. For example, various aspects of the unique identifier 184 (e.g., the first digit or series of digits/characters, the last digit or series of digits/characters, etc.) can correspond to/represent aspects of a transaction, such as those that are of interest for the payment processor to track (e.g., the identity of the vendor, the purchase price, etc.).

At step 225, processor 110 executing one or more of software modules 130, including, in certain implementations, payment processing application 170, configures computing device 105 to provide the unique identifier 184 to a paying party 145. For example, one or more notifications (such as an e-mail or SMS message) containing the unique identifier 184 can be generated and/or transmitted to a party that intends to provide payment for the transaction. For example, FIG. 5 depicts an exemplary e-mail notification 500 that can be provided to purchaser 125 and/or paying party 145, notifying the relevant party of the unique identifier 184. As will be described in greater detail below, the paying party 145 can later furnish the unique identifier 184 together with the alternative payment submission, and, in doing so, complete payment for the transaction.

At this juncture, it should be noted that in some implementations the paying party 145 is the same party as the purchaser 125 (that is, the purchaser 125 ultimately provides payment for the items he/she selected) while in other implementations the paying party 145 is a third party that is not the purchaser 125. By way of example, a child can perform the initial purchase of the item from the vendor, and can then provide the unique identifier 184 to a parent who can proceed to provide payment for the item using the unique identifier 184. Other such comparable scenarios can be readily appreciated, such as an employee ordering an item for professional use and providing the unique identifier 184 to his/her employer to submit with payment, and/or the recipient of a particular government benefit program ordering an item and providing the unique identifier 184 to the program administration for payment processing. In doing so, purchaser 125 can independently initiate a purchase from vendor 115, while enabling paying party 145 to ultimately provide the payment for the purchase, by providing the unique identifier 184 issued in relation to the transaction while making such a payment.

Moreover, it should be noted that in certain implementations, the unique identifier 184 can be associated with a user account 186. For example, as shown in FIG. 3, a user account 186 (such as an e-mail address or any other such identifier) can be used to associate multiple orders with a single purchaser 125. In doing so, such orders can all be associated with the user account 186 thereby obviating the need for providing a unique identifier 184 in order to elicit a payment submission, as will be described in detail below.

Then, at step 230, processor 110 executing one or more of software modules 130, including, in certain implementations, payment processing application 170, configures computing device 105 to receive an input of the unique identifier 184. Preferably, the unique identifier 184 is input by the purchaser 125 and/or paying party 145 into ATM 135, and is transmitted to computing device 105 via network/Internet 160, in a manner known to those of ordinary skill in the art. In doing so, the purchaser 125 and/or the paying party 145 can identify the transaction for which payment is to be submitted.

Alternatively, in certain implementations, such as those where the unique identifier 184 is associated with a user account 186, user account 186 can be provided in lieu of the unique identifier. In providing the user account 186, the transactions associated with one or more unique identifiers 184 that are associated with the user account 186 can be retrieved. It should be noted that in such implementations, a user (e.g., purchaser 125 or paying party 145) can be further prompted to identify one or more of the unique identifiers 184 associated with the user account 186 (each unique identifier 184 preferably corresponding to a different transaction for which payment is to be made). It can be appreciated that various conveniences and efficiencies result through the use of such user accounts: (a) the purchaser 125 or paying party 145 need only provide the user account 186 in order to pay for the transaction (as opposed to the unique identifier 184, which is likely to be more difficult to remember, as well as more susceptible to mistyping); and (b) the purchaser 125 or paying party 145 can select multiple transactions (each of which is associated with the user account 186), and pay for all of the selected transactions with a single payment in an amount sufficient to cover the total payment amount of the selected transactions.

At step 235, processor 110 executing one or more of software modules 130, including, in certain implementations, payment processing application 170, configures computing device 105 to verify that the unique identifier 184 has been received within a specified timeframe. That is, it can be appreciated that in certain implementations, the nature of the transactions enabled by the systems and methods described herein entail a transaction initiation (whereby the purchaser 125 selects the item for purchase) and a subsequent payment submission (whereby the purchaser 125 or a paying party 145 provides the unique identifier 184 together with payment for the purchase). Being that these two events are generally separated in time (such as in the order of minutes, hours, or days), it can be appreciated that a time limit can be preferably imposed, whereby the subsequent payment submission is only be accepted during a limited timeframe. For example, as shown in FIG. 5, a timeframe of 48 hours can be imposed, after which the cash payment will not be accepted. In doing so, the vendor can maintain a certain degree of inventory predictability by effectively precluding purchasers 125 from selecting an item for purchase but delaying (or never providing) payment for such items. It should also be understood that in certain implementations and/or scenarios, no such timeframe need necessarily be imposed (e.g., for items for which the vendor 115 has ample inventory).

Moreover, it should be noted that in various implementations, vendors can have the option to prevent or exclude a purchaser 125 from utilizing the various methods described herein with regard to certain items from their inventory. For example, with regard to items which the vendor 115 has a limited inventory, the vendor can require that payment be provided immediately upon purchase, thereby precluding purchasers 125 from utilizing the methods disclosed herein. Alternatively, in certain implementations the vendor 115 can impose a surcharge on the purchaser 125 for utilizing the alternative methods described herein, thereby accounting for the uncertainty that the vendor is subject to due to the fact that the vendor must generally maintain inventory of the items purchased by the purchaser 125, despite not having initially received payment for such items.

In the event of a determination that the alternative payment submission was not provided within the specified timeframe, at step 240, processor 110 executing one or more of software modules 130, including, in certain implementations, payment processing application 170, configures computing device 105 to refuse the alternative payment submission. That is, in the event that a purchaser 125 or a paying party 145 provides the unique identifier 184 to ATM 135 after the expiration of the payment timeframe (preferably set by the vendor 115 at the time of the initial purchase by the purchaser 125, such as 48 hours, as shown in FIG. 5), the alternative payment submission is refused.

Figure 6:
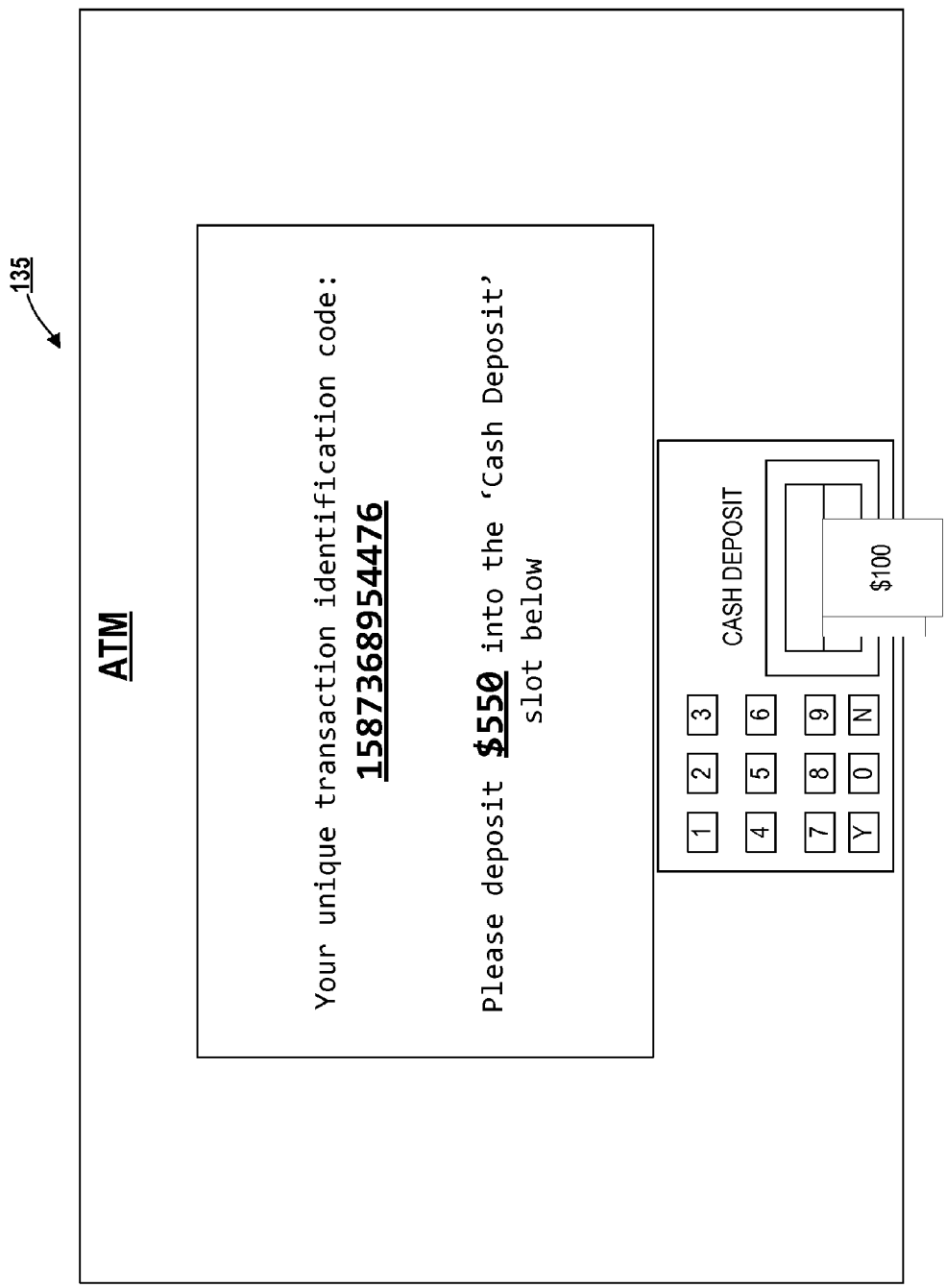
FIG. 6 depicts an exemplary ATM eliciting a cash payment submission based on the input of a unique identifier in accordance with at least one embodiment disclosed herein.

When the unique identifier 184 is provided within the referenced timeframe (when such timeframe is imposed), at step 245, processor 110 executing one or more of software modules 130, including, in certain implementations, payment processing application 170, configures computing device 105 to elicit the alternative payment submission (e.g., cash) corresponding to the payment amount. Preferably, such alternative payment submission is provided by the purchaser 125 or the paying party 145 at ATM 135. It should be understood that ATM 145 is an automated teller machine capable of receiving and/or processing cash payments, as are known to those of ordinary skill in the art. By way of illustration, FIG. 6 depicts an exemplary ATM 135 eliciting a cash payment submission based on the input of a unique identifier, as described herein. Additionally, in certain implementations ATM 145 provides the purchaser 125 or the paying party 145 with a receipt confirming the successfully received payment.

At step 250, processor 110 executing one or more of software modules 130, including, in certain implementations, payment processing application 170, configures computing device 105 to notify the vendor 115 of receipt of the alternative payment submission. That is, upon receiving the alternative payment submission from purchaser 125 or paying party 145 via ATM 135, a message and/or notification can be transmitted to vendor 115, notifying the vendor that the transaction has been paid for. Based on this notification, vendor 115 can ship the purchased item to purchaser 125 or provide the purchased service, etc. By way of illustration, FIG. 7 depicts an exemplary payment notification 700. Additionally, the alternative payment submission (received via ATM 135 at step 245) can also be reconciled, such that vendor 115 ultimately receives the appropriate payment, using traditional payment reconciliation methods known to those of ordinary skill in the art.

Figure 8:
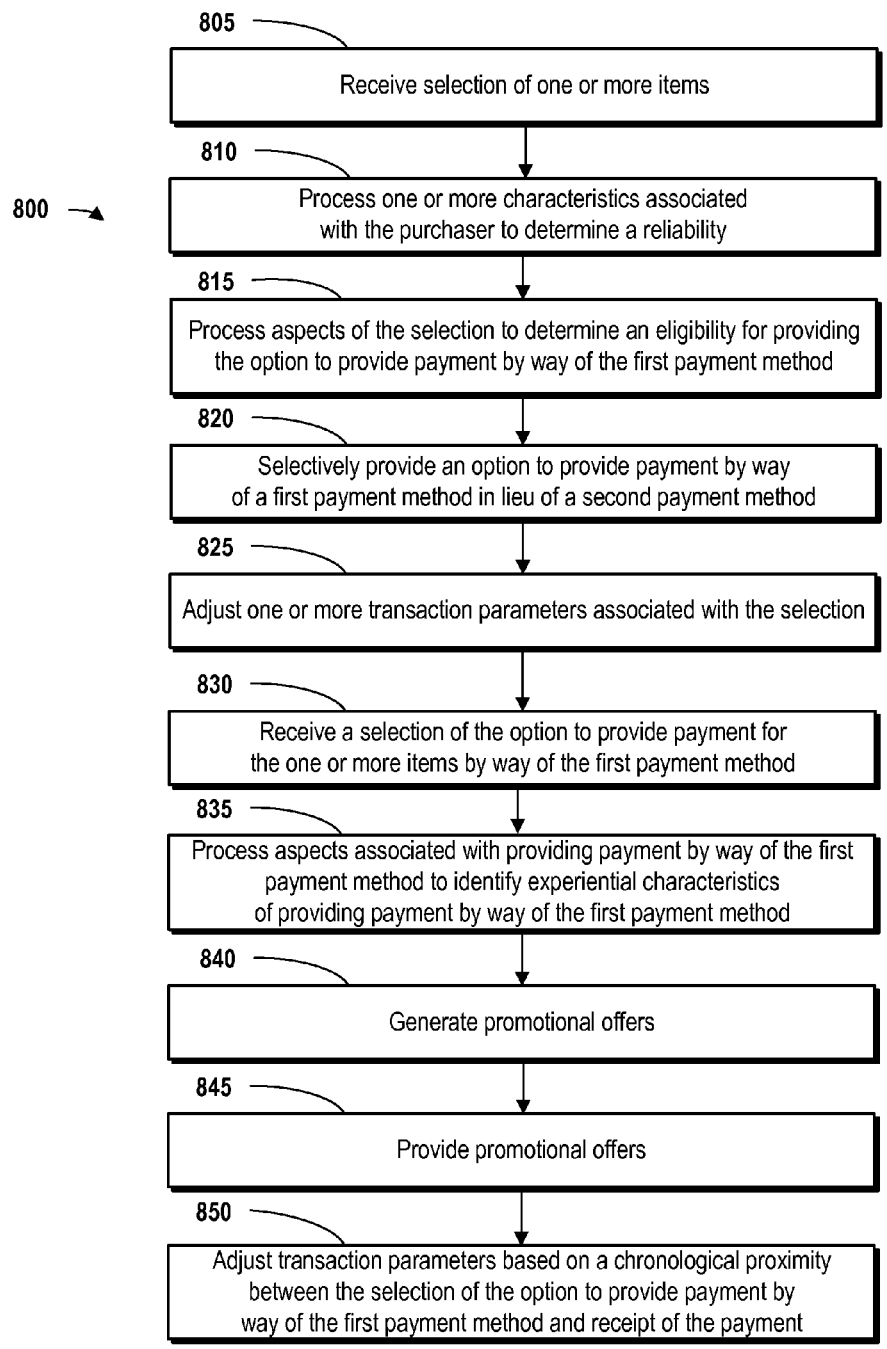
FIG. 8 is a flow diagram showing a routine that illustrates a broad aspect of a method for facilitating an alternative payment submission in accordance with at least one embodiment disclosed herein.

Turning now to FIG. 8, a flow diagram is described showing a routine 800 that illustrates a broad aspect of a method for facilitating an alternative payment submission in accordance with at least one embodiment disclosed herein.

The process begins at step 805 where processor 110 executing one or more of software modules 130, including, in certain implementations, payment processing application 170, configures computing device 105 to receive a selection by a purchaser of one or more items. For example, as referenced and illustrated herein, a vendor such as an e-commerce retailer can receive a selection of one or more items selected by a user for purchase.

At step 810, processor 110 executing one or more of software modules 130, including, in certain implementations, payment processing application 170, configures computing device 105 to process one or more characteristics associated with the purchaser. In doing so, a reliability of the purchaser can be determined. That is, it can be appreciated that in light of the fact that selecting an option to provide an alternative payment submission (in lieu of more conventional payment methods such as a credit cards, bank transfers, etc.) does not require such payment to be submitted immediately upon initiating the purchase, it can be expected that some number or percentage of such alternative payment transactions will not ultimately be completed (e.g., if the purchaser reconsiders making the purchase and thus decides not to tender payment). As such, it can be advantageous to determine a reliability of a particular purchaser which can reflect the likelihood that a selection by the purchaser of an option to provide an alternative payment submission is ultimately likely to result in a completed transaction (by way of the purchaser tendering payment for the selected items).

By way of illustration, in certain implementations various previous instances of the purchaser providing the first payment method can be processed. For example, one or more previous instances of the purchaser providing the first payment method (such as can be stored in a purchase history database maintained by the vendor and/or any other party) can be processed to determine a frequency with which the purchaser provides payment subsequent to a selection of the first payment method. Additionally, a minimum reliability threshold can be dictated by a vendor, reflecting the fact that only those purchasers whose reliability can be determined to meet or exceed such a threshold are eligible to select or otherwise utilize an alternative payment submission (e.g., paying with cash). In doing so, a vendor can restrict or limit the utilization of such alternative payment submission (which, as noted, can entail a greater risk of attrition) to those users who have been determined to be highly reliable (i.e., meeting or exceeding a defined threshold, such as 90% reliability) with respect to submitting payment for transactions in which the use of an alternative payment submission was selected.

For example, FIG. 9 depicts an exemplary chart showing various aspects of previous instances in which various users (User A and User B) elected to utilize an alternative payment submission. It can be appreciated with reference to FIG. 9 that User A has a reliability percentage of 80% (corresponding to the 20 out of 25 instances that an alternative payment submission was selected and such payment was ultimately received) and User B has a reliability percentage of 92% (corresponding to the 11 out of 12 instances that an alternative payment submission was selected and such payment was ultimately received). Accordingly, with respect to a vendor that has set a reliability threshold for accepting alternative payment submissions at 90%, User B (having a reliability of 92%) would be eligible to select such an alternative payment submission while User A (having a reliability of 80%) would not.

Moreover, in certain implementations the various systems and methods described herein can be configured to consider and/or account for the expediency with which a purchaser provides payment subsequent to a selecting of an alternative payment submission. That is, it can be appreciated that some purchasers may exhibit greater diligence in providing payment after initiating a purchase using such an alternative payment submission, while others may be relatively less diligent. As such, it can be advantageous for vendors to selectively provide the option to utilize such an alternative payment submission, for example, only to those users that can be determined to be relatively diligent (e.g., those users that meet or exceed a defined expediency threshold corresponding to the average amount of time—such as 24 hours—between the selection of the option to provide such an alternative payment and the receipt of the payment). In doing so, one or more previous instances of the purchaser providing a first payment method (i.e., an alternative payment submission such as cash) can be processed to determine an expediency with which the purchaser provides payment subsequent to a selection of the first payment method. For example, it can be further appreciated with reference to FIG. 9 that User A demonstrates an expediency of 22.6 hours (corresponding to the average amount of time between the selection of the option to provide an alternative payment submission and the receipt of the payment) while User B demonstrates an expediency of 33.2 hours. Accordingly, with respect to a vendor that has set an expediency threshold for accepting alternative payment submissions at 24 hours, User A (having an expediency of 22.6 hours) would be eligible to select such an alternative payment submission while User B (having an expediency of 33.2 hours) would not. It should also be noted that, in certain implementations, various methods and/or systems described herein can be configured such that a purchaser must meet both a certain reliability threshold and a certain expediency threshold in order to be eligible to utilize an alternative payment submission. Moreover, it should be noted that the various illustrations provided with respect to determinations that can be performed with respect to the reliability, expediency, etc., of a particular user or users are merely exemplary and are provided in the interests of simplicity and clarity. However, it should be understood that any number of additional/alternative determinations can be performed (such as with respect to other aspects, parameters, criteria, etc.) in order to compute the reliability, expediency, etc., of a particular user or users, and all such approaches are within the scope of the present disclosure.

At step 815, processor 110 executing one or more of software modules 130, including, in certain implementations, payment processing application 170, configures computing device 105 to process one or more aspects of the selection. For example, the type of item or items (e.g., the item category such as electronics, computers, etc., the item manufacturer such as Apple, Samsung, etc.), the inventory status of the item or items (e.g., quantity in stock, rate at which stock is depleting, time within which stock can be replenished, etc.), and/or the price of the item or items can be analyzed in order to determine whether (or not) the purchase is eligible for an alternative payment submission. That is, it can be appreciated that a vendor may wish to limit or otherwise restrict the option to provide alternative payment submissions from various types of items, such as certain types of items (e.g., items known or determined to be in high demand), items that are above a certain price threshold (e.g., above $1000), and/or items that have low or limited inventory quantities. As such, any/all of such aspects of the selection provided by the purchaser can be processed in order to determine the eligibility for providing, in relation to the selection, the option to provide payment for the one or more items by way of the first payment method (i.e., an alternative payment submission) in lieu of the second payment method.

At step 820, processor 110 executing one or more of software modules 130, including, in certain implementations, payment processing application 170, configures computing device 105 to selectively provide to the purchaser an option to provide payment for the one or more items by way of a first payment method (e.g., an alternative payment method such as a cash payment or any other such payment that does not require the purchaser to provide banking information). In certain implementations, such an option can be selectively provided based on a reliability (such as the reliability determined at 810). Moreover, in certain implementations, such an option can be provided with respect to a payment method (e.g., an alternative payment submission such as paying with cash at an ATM or retail location) that can be provided by a purchaser in lieu of a second payment method (such as a credit card or bank transfer payment or any other such payment method requiring the purchaser to provide banking information). For example, as depicted in FIG. 3 and described herein, by selecting button 320 (when such a transaction is eligible for alternative payment submissions, as can be determined as described herein), a purchaser can indicate his/her intention to utilize an alternative payment submission, such as cash, in lieu of traditional payment methods such as credit card or bank transfer.

Moreover, in certain implementations, an option to provide payment for the one or more items by way of a first payment method in lieu of a second payment method can be selectively provided to the purchaser, based on (a) a determined reliability (such as the reliability determined at 810) and/or (b) a determined eligibility (such as the eligibility determined at 815). For example, both the reliability of the purchaser (reflecting the degree to which a particular purchaser is reliable with respect to providing payment for purchases with respect to which an alternative payment submission was selected and/or the expediency with which the purchaser provides payment subsequent to selecting an alternative payment submission option) as well as the determined eligibility of the selection/purchase (reflecting whether or not the item or items selected are eligible for purchase by way of an alternative payment submission) can be considered in determining whether or not to provide an option for alternative payment submission with respect to a particular transaction. For example, in certain implementations, in order to provide an option for alternative payment submission with respect to a particular transaction, the purchaser must be determined to be sufficiently reliable and the selection/purchase must also be determined to be eligible for such a payment submission.

Moreover, in certain implementations, one or more associations/dependencies can be implemented with respect to respective purchaser reliabilities and selection/purchase eligibilities. For example, system 100 can be configured such that a purchaser determined to have one level of reliability (e.g., greater than 90% reliability) can be associated with one eligibility threshold (e.g., items up to $2000 in value, items that are limited stock, etc.), while a purchaser determined to have another level of reliability (e.g., between 80% and 89% reliability) can be associated with another eligibility threshold (e.g., only items up to $500 in value, only items having sufficient stock, etc.). In doing so, a vendor can increase the number of items eligible for purchase via an alternative payment submission by users determined to be highly reliable, while limiting the number of items eligible for purchase via an alternative payment submission by users determined to be relatively less reliable.

At step 825, processor 110 executing one or more of software modules 130, including, in certain implementations, payment processing application 170, configures computing device 105 to adjust one or more transaction parameters associated with the selection. In certain implementations, such transaction parameters can be adjusted based on a reliability of a purchaser (such as the reliability determined at 810). That is, it can be advantageous for certain vendors to enable various adjustments, such as to the pricing of the transaction, in order to incentivize a purchaser to subsequently provide payment to complete a transaction with respect to which an option to provide an alternative payment submission has been selected. For example, a price discount or promotion can be provided to a purchaser who attains/maintains a certain reliability percentage (e.g., above 95%). By way of further example, a penalty or additional charge can be applied with respect to transactions initiated by a purchaser having a reliability below a certain percentage (e.g., below 85%). By way of yet further example, a relatively lesser surcharge/fee can be employed with respect to a selection of an alternative payment submission by a purchaser having a relatively higher reliability (e.g., rounding up the final purchase price to the nearest $10 increment, such as from $152.25 to $160) while a relatively greater surcharge/fee can be employed with respect to such a selection by a purchaser having a relatively lower reliability (e.g., rounding up the final purchase price to the nearest $20 increment, such as from $152.25 to $170). In doing so, a vendor can incentivize purchasers to utilize the alternative payment submission option in a responsible fashion, and can also capture a risk premium not attainable using conventional payment methods (e.g., credit cards).

At step 830, processor 110 executing one or more of software modules 130, including, in certain implementations, payment processing application 170, configures computing device 105 to receive a selection of an option to provide payment for one or more items by way of the first payment method in lieu of the second payment method. In certain implementations, such a selection can be received in substantially the same manner as described above at 205 and depicted with respect to FIG. 3.

Figure 10:
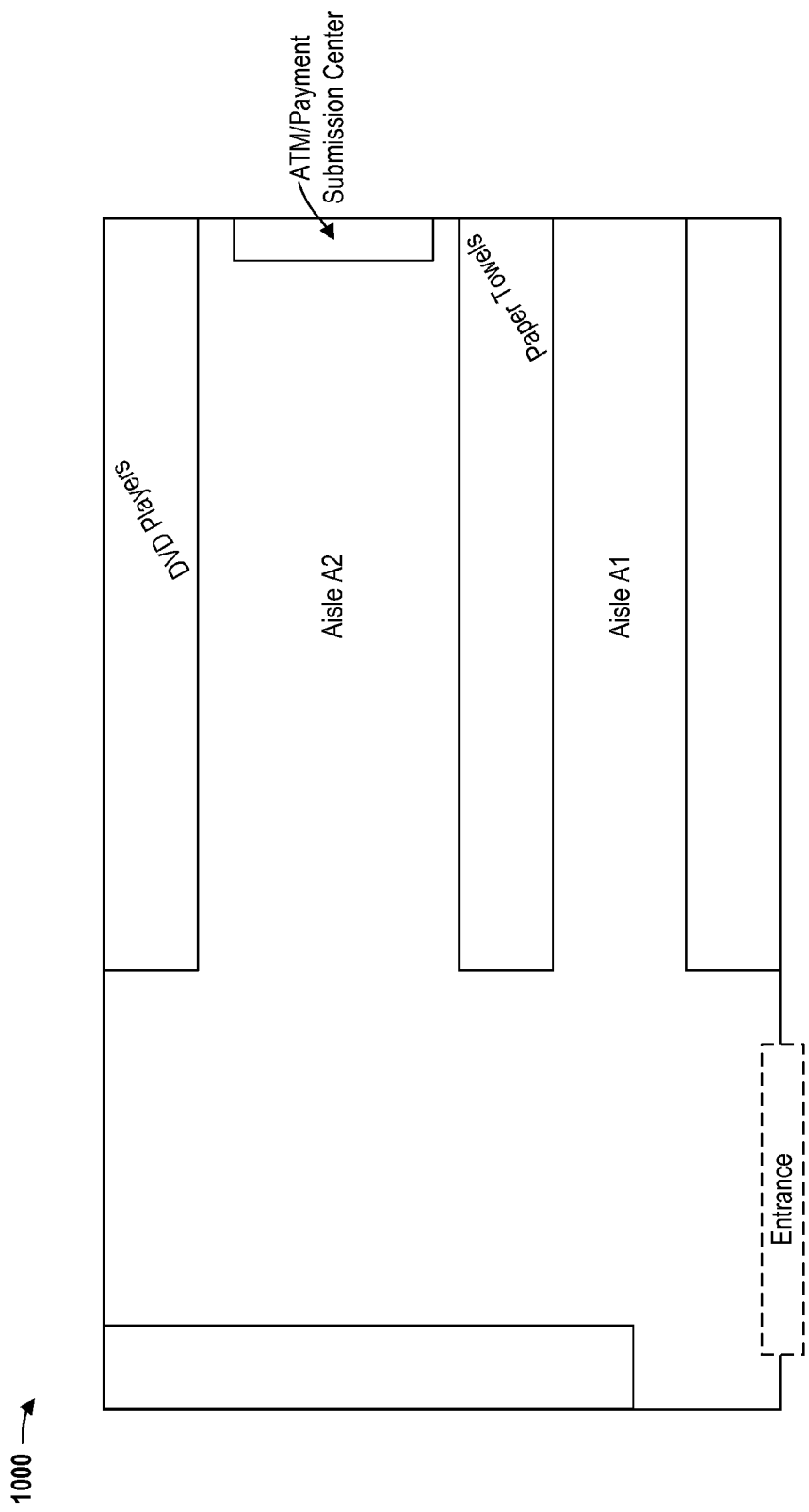
FIG. 10 depicts an exemplary diagram depicting the layout of a retail store with respect to which payment will be provided in completion of a purchase initiated by way of a selection of an option to provide an alternative payment submission.

At step 835, processor 110 executing one or more of software modules 130, including, in certain implementations, payment processing application 170, configures computing device 105 to process one or more aspects associated with providing payment by way of the first payment method. In doing so, one or more experiential characteristics of providing payment by way of the first payment method (i.e., an alternative payment submission) can be identified. For example, one or more maps or schematic diagrams reflecting the layout of one or more retail establishments, such as one or more stores with respect to which a purchaser is likely to visit in order to complete the initiated transaction can be analyzed. By way of illustration, FIG. 10 depicts an exemplary diagram 1000 depicting the layout of a retail store with respect to which it is known (or likely) that a purchaser will visit in order to provide payment and complete a purchase initiated by way of a selection of an option to provide an alternative payment submission. Accordingly, based on an analysis of the layout of the store, it can be determined that the purchaser will be required to visit Aisle A2 in order to provide payment at the ATM/Payment Submission Center (such as using conventional routing techniques as are known to those of ordinary skill in the art). As such, it can be further determined that the purchaser is expected to walk by (or otherwise come into close proximity to) paper towels, which are located in Aisle A2 (as shown in FIG. 10).

Figure 11:
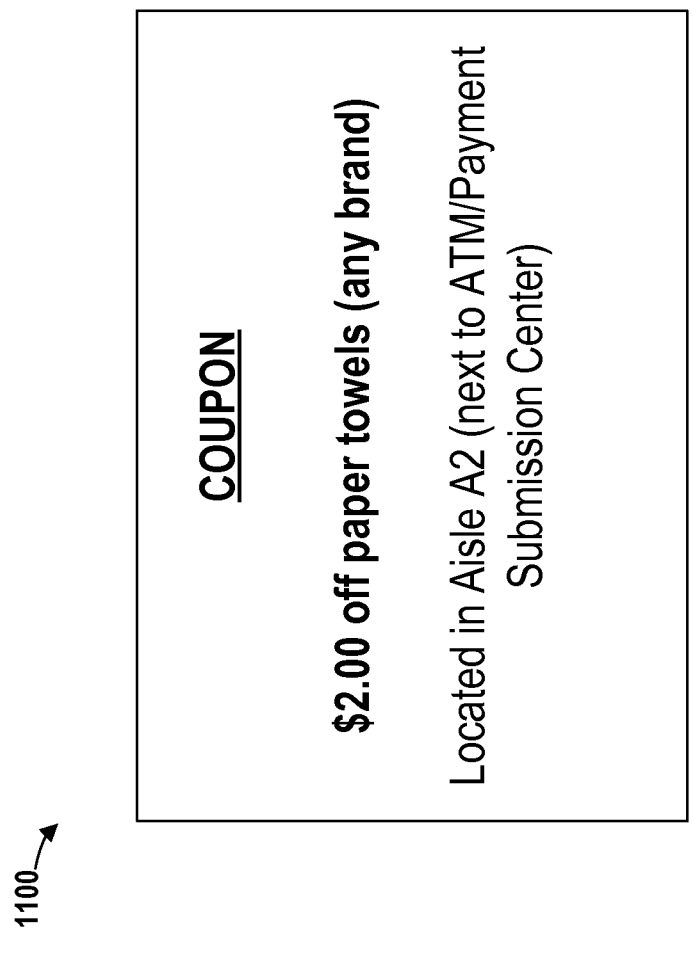
FIG. 11 depicts an exemplary coupon.

At step 840, processor 110 executing one or more of software modules 130, including, in certain implementations, payment processing application 170, configures computing device 105 to generate one or more promotional offers. In certain implementations, such offers can be generated based on the one or more experiential characteristics (such as those identified at 835). That is, having determined, for example, that a purchaser will visit Aisle A2, a promotional offer (such as a coupon, discount code, etc.) can be generated to correspond to/compliment such a determination. For example, FIG. 11 depicts an exemplary coupon 1100 that can be generated. It can be appreciated that, in light of the likelihood/near-certainty that the purchaser will visit Aisle A2 in order to provide payment in completion of a transaction with respect to which an alternative payment submission option was selected, such a coupon (for a product located in the same aisle) can be particularly effective.

Moreover, in certain implementations, such promotional offers can be generated, based on the one or more items (such as the items selected for purchase at 805) and the one or more experiential characteristics. That is, in light of the purchase for which the purchaser is visiting the store in order to provide payment and/or pick up the item, a promotional offer can be generated based on the contents of such an order (i.e., the items purchased by selecting an alternative payment submission option) in conjunction with the various experiential characteristics (e.g., the layout of the store, as referenced above). For example, in a scenario where a purchaser is providing payment for a television, a promotional offer for a complimentary item that is in relatively close proximity to the ATM/Payment Submission Center, such as a DVD player (as shown in FIG. 10) can be generated.

Additionally, in certain implementations, such promotional offers can be generated, based on one or more previously purchased items (as reflected, for example, in a purchase history associated with the purchaser) and the one or more experiential characteristics. That is, even in a scenario where a user is visiting the store in order to provide payment and/or pick up one item (e.g., a pair of shoes), in light of prior purchases that the purchaser has made, a promotional offer can be generated based on the contents of such prior orders in conjunction with the various experiential characteristics (e.g., the layout of the store, as referenced above). For example, in a scenario where a purchaser has previously purchased a television (even if the user is presently visiting the store to provide payment for a payment for a pair of shoes), a promotional offer for an item that is both complimentary to the previously purchased item and that is also in relatively close proximity to the ATM/Payment Submission Center, such as a DVD player (as shown in FIG. 10) can be generated.

In certain implementations, promotional offers can also be generated based on the payment method (or methods) utilized by a purchaser in previous transactions (both those initiated via an e-commerce website and/or those initiated in a traditional 'brick and mortar' retail setting). So, for example, if a purchaser can be determined (such as based on an order history maintained by the vendor) to have selected an option to provide an alternate payment submission (e.g., to pay with cash) in several prior e-commerce purchases, and can also be determined to have paid with cash in one or more traditional retail transactions, a promotional offer can be generated/provided based on such payment tendencies (e.g., the propensity to pay with cash), such as an offer for a pre-paid debit card.

At step 845, processor 110 executing one or more of software modules 130, including, in certain implementations, payment processing application 170, configures computing device 105 to provide one or more promotional offers to the purchaser. For example, in certain implementations such promotional offers can be provided in conjunction with the providing of the identifier (such as by way of notification, e-mail, etc.), substantially in the manner described at 225 and depicted in FIG. 5. By way of further example, in certain implementations such promotional offers can be provided in conjunction with a receipt provided to the purchaser confirming the successfully received payment, as referenced at 245.

At step 850, processor 110 executing one or more of software modules 130, including, in certain implementations, payment processing application 170, configures computing device 105 to adjust one or more transaction parameters associated with the selection. In certain implementations, such an adjustment can be based on a chronological proximity between (a) the selection of the option to provide payment for the one or more items by way of the first payment method and (b) receipt of the payment. That is, as noted above, it can be advantageous for a vendor to incentivize a purchaser to provide payment in completion of a transaction with respect to which an alternative payment submission option was selected. Accordingly, adjustments can be employed with respect to various transaction parameters such as the price and/or other charges or fees associated with a transaction. For example, various discounts can be offered to purchasers who provide payment expediently (e.g., within a defined timeframe of initiating the purchase), while additional charges or penalties can be levied with respect to transactions where the purchaser is not expedient in providing payment. FIG. 12 depicts an exemplary table 1200 of such adjustments. It should be noted that a purchaser can be notified of such adjustments, for example, by providing notification of them in conjunction with the manner in which the purchaser is provided the identifier (such as by way of notification, e-mail, etc.), substantially in the manner described at 225 and depicted in FIG. 5.

At this juncture, it should be noted that although much of the foregoing description has been directed to systems and methods for facilitating cash payments for e-commerce transactions, the systems and methods disclosed herein can be similarly deployed and/or implemented in scenarios, situations, and settings far beyond the referenced scenarios. It can be readily appreciated that payment processing system 100 can be effectively employed in practically any scenario where in-person, real-world transactions can have advantages over virtual or electronic methods. It should be further understood that any such implementation and/or deployment is within the scope of the systems and methods described herein. Moreover, the references herein to cash payments should be understood to be exemplary and thus non-limiting. As such, it can be further appreciated that the methods and systems described herein can be readily adapted towards the facilitation of the receipt of other payment methods, such as depositing a personal check, inputting a pre-paid gift card or debit card, or swiping a credit card in ATM 135 (in lieu of providing such information over the Internet). Additionally, it should be understood that payment processing system 100 is referred to as such in the interests of simplicity and clarity, however, in certain implementations, payment processing system 100 can be configured such that it enables any number of operations described herein (e.g., determining purchaser reliabilities, generating/providing promotional offers, etc.), even if such operations do not directly pertain to payment processing.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for facilitating alternative payments. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method for facilitating completion of ecommerce sales of items between vendors and purchasers, the method comprising:
receiving, over a communication network by a processor executing code from a vendor computing device, a transaction notification representing that an ecommerce sale of at least one item has been initiated during a first data communication session and not completed, and that further identifies a transaction price for the at least one item, but does not comprise an identity of the purchaser;
generating, by the processor executing code, a unique identifier that corresponds to the transaction notification, wherein the unique identifier is required to be received from an automated teller machine during a second data communication session occurring at a time later than the first data communication session to complete the ecommerce sale;
calculating, by the processor executing code, an adjusted transaction price as a function of a rounding algorithm that rounds the transaction price up by an amount to arrive at a whole value above the transaction price;

transmitting, over a communication network by the processor executing code to a purchaser computing device, the unique identifier and the adjusted transaction price;

receiving, during the second data communication session over a communication network by the processor executing code directly or indirectly from the automated teller machine, input information representing input that was received at the automated teller machine;

in response to receiving the input information, determining by the processor executing code during the second data communication session, that the input that was received at the automated teller machine includes the unique identifier that corresponds to the transaction notification;

determining, by the processor executing code, whether the input is received within a specified timeframe, wherein:

in response to determining, by the processor executing code, that the input is not received within the specified timeframe:

transmitting, by the processor, directly or indirectly to the automated teller machine, an acknowledge notification to refuse receipt of payment; and in response to determining, by the processor executing code, that the input is received within the specified timeframe:

transmitting, over a communication network by the processor directly or indirectly to the automated teller machine, an acknowledgement notification to elicit cash receipt of payment of the adjusted transaction price at the automated teller machine;

receiving, over a communication network by the processor executing code directly or indirectly from the automated teller machine, payment information representing that cash payment of the adjusted transaction price has been received at the automated teller machine; and providing, over a communication network by the processor executing code to the vendor computing device, a confirmation of cash receipt of the adjusted transaction price at the automated teller machine for facilitating completion of the ecommerce sale.

2. The method of claim 1, further comprising:
storing, by the processor executing code, the unique identifier in at least one database; wherein the step of processing the input information to determine that the input that was received at the automated teller machine matches the unique identifier includes matching the input information with the unique identifier stored in the at least one database.

3. The method of claim 1, wherein the transaction notification does not include one or more details regarding the at least one item.

4. The method of claim 1, wherein the transaction notification includes a vendor reference identifier.

5. The method of claim 1, wherein the ecommerce sale further comprises a surcharge imposed by the vendor.

6. The method of claim 1, further comprising:
processing, by the processor executing code, one or more previous instances of the purchaser providing payment at an automated teller machine method to determine a frequency with which the purchaser provides payment at an automated teller machine.

7. The method of claim 1, further comprising:
processing, by the processor executing code, one or more previous instances of the purchaser providing payment at an automated teller machine method to determine an expediency with which the purchaser provides payment at an automated teller machine.

8. The method of claim 1, further comprising:
associating, by the processor executing code, the unique identifier with a user account having associated user account login information; and
upon receipt of the user account login information from the automated teller machine, retrieving the unique identifier associated with the user account.

9. The method of claim 1, further comprising:
reconciling, by the processor executing code, payment of the adjusted transaction price that was received at the automatic teller machine for the vendor to receive at least a portion of the payment in exchange for the at least one item.

10. A system comprising: one or more processors configured interact with a non-transitory computer-readable medium in order to execute code and perform operations comprising:

receiving, over a communication network from a vendor computing device, a transaction notification that represents an ecommerce sale of at least one item has been initiated during a first data communication session and not completed, and that further identifies a transaction price for the at least one item but does not include one or more details regarding the at least one item and does not comprise an identity of the purchaser;

generating a unique identifier that corresponds to the transaction notification, wherein the unique identifier is required to be received from an automated teller machine during a second data communication session occurring at a time later than the first data communication session to complete the ecommerce sale;

calculating an adjusted transaction price as a function of a rounding algorithm that rounds the transaction price up by an amount to arrive at a whole value above the transaction price;

transmitting, over a communication network to a purchaser computing device, the unique identifier and the adjusted transaction price;

receiving, during the second data communication session over a communication network directly or indirectly from the automated teller machine, input information representing input that was received at the automated teller machine;

in response to receiving the input information, determining that the input that was received at the automated teller machine includes the unique identifier that corresponds to the transaction notification;

determining whether the input is received within a specified timeframe, wherein in response to determining that the input is not received within the specified timeframe:

transmitting, by the processor executing code directly or indirectly to the automated teller machine, an acknowledge notification to refuse receipt of payment; and in response to determining that the input is received within the specified timeframe:

transmitting, over a communication network by the processor directly or indirectly to the automated teller machine, an acknowledgement notification to elicit cash receipt of payment of the adjusted transaction price at the automated teller machine;

receiving, over a communication network by the processor executing code directly or indirectly from the automated teller machine, payment information representing that cash payment of the adjusted transaction price has been received at the automated teller machine; and providing, over a communication network by the processor executing code to the vendor computing device, a confirmation of cash receipt of the adjusted transaction price at the automated teller machine for facilitating completion of the ecommerce sale.

11. The system of claim 10, the one or more processors are further configured to interact with a computer-readable medium in order to perform operations comprising:

storing the unique identifier in at least one database;

wherein the step of processing the input information to determine that the input that was received at the automated teller machine matches the unique identifier includes matching the input information with the unique identifier stored in the at least one database.

12. The system of claim 10, wherein the transaction notification does not include one or more details regarding the at least one item.

13. The system of claim 10, wherein the transaction notification includes a vendor reference identifier.

14. The system of claim 10, wherein the e-commerce sale further comprises a purchase by the purchaser from the vendor of one or more items designated by the vendor as being eligible for purchase with a surcharge imposed by the vendor, by way of the first payment method.

15. The system of claim 10, the one or more processors are further configured to interact with a computer-readable medium in order to perform operations comprising:

processing one or more previous instances of the purchaser providing payment at an automated teller machine method to determine a frequency with which the purchaser provides payment at an automated teller machine.

16. The system of claim 10, the one or more processors are further configured to interact with a computer-readable medium in order to perform operations comprising:

processing one or more previous instances of the purchaser providing payment at an automated teller machine method to determine an expediency with which the purchaser provides payment at an automated teller machine.

17. The system of claim 10, the one or more processors are further configured to interact with a computer-readable medium in order to perform operations comprising:

associating the unique identifier with a user account having associated user account login information; and upon receipt of the user account login information from the automated teller machine, retrieving the unique identifier associated with the user account.

18. The system of claim 10, the one or more processors are further configured to interact with a computer-readable medium in order to perform operations comprising:

reconciling payment of the adjusted transaction price that was received at the automatic teller machine for the vendor to receive at least a portion of the payment in exchange for the at least one item.

* * * * *